US008159175B2

(12) United States Patent
    Limor

(10) Patent No.: US 8,159,175 B2
(45) Date of Patent: Apr. 17, 2012

(54) VARIABLE VOLTAGE SUPPLY SYSTEM

(75) Inventor: Shimon Limor, Ashkelon (IL)

(73) Assignee: PowerSines Ltd., Or Yehuda (IL)

( * ) Notice: Subject to any disclaimer, the term of this patent is extended or adjusted under 35 U.S.C. 154(b) by 570 days.

(21) Appl. No.: 12/373,744

(22) PCT Filed: Jul. 16, 2007

(86) PCT No.: PCT/IL2007/000892
§ 371 (c)(1),
(2), (4) Date: Jan. 14, 2009

(87) PCT Pub. No.: WO2008/010213
PCT Pub. Date: Jan. 24, 2008

(65) Prior Publication Data
US 2009/0309536 A1    Dec. 17, 2009

Related U.S. Application Data

(60) Provisional application No. 60/831,238, filed on Jul. 17, 2006.

(30) Foreign Application Priority Data

Nov. 14, 2006   (IL) .......................................... 179284

(51) Int. Cl.
    *G05B 1/06*    (2006.01)
(52) U.S. Cl. ......................... 318/656; 323/328; 323/332
(58) Field of Classification Search .................. 323/328,
        323/332, 340, 341, 343–347, 355; 318/656,
        318/657, 658
See application file for complete search history.

(56) References Cited

U.S. PATENT DOCUMENTS

| | | | |
|---|---|---|---|
| 4,219,759 A | | 8/1980 | Hirschfeld |
| 4,336,488 A | | 6/1982 | Glavitsch et al. |
| 4,860,145 A | * | 8/1989 | Klingbiel ........................ 361/18 |
| 5,231,339 A | | 7/1993 | Kishimoto et al. |
| 5,557,249 A | * | 9/1996 | Reynal ............... 336/5 |
| 5,952,790 A | * | 9/1999 | Nerone et al. ............ 315/209 R |
| 6,014,323 A | * | 1/2000 | Aiello et al. .................... 363/71 |
| 6,323,604 B1 | * | 11/2001 | Boenigk et al. ............... 315/290 |
| 6,351,106 B1 | | 2/2002 | Kramer et al. |
| 6,741,068 B2 | * | 5/2004 | Soler Soneira et al. ....... 323/346 |
| 6,954,366 B2 | * | 10/2005 | Lai et al. ........................ 363/71 |
| 2005/0237036 A1 | | 10/2005 | Nguyen et al. |

FOREIGN PATENT DOCUMENTS

CN          1055266         10/1991
(Continued)

OTHER PUBLICATIONS

Summary of Office Action Dated Oct. 18, 2010 From the Instituto Mexicano de la Propriedad Industrial (IMPI) Re. Application No. MX/a/2009/000642.

(Continued)

*Primary Examiner* — Rina Duda

(57) ABSTRACT

Apparatus for controlling the voltage supplied to a load, comprising:
a multi-phase transformer having a primary and a secondary winding for each phase, each secondary being connected in series between an input line and an output directed to the load; and
the primary is configurable by switches such that the phase of the voltage of the secondary is different from the line to which it is connected by a phase different from 0 and 180 degrees.

32 Claims, 13 Drawing Sheets

FOREIGN PATENT DOCUMENTS

| | | |
|---|---|---|
| DE | 383419 | 10/1923 |
| DE | 2034638 | 1/1972 |
| EP | 0774830 | 5/1997 |
| EP | 1235322 | 8/2002 |
| EP | 1341295 | 9/2003 |
| EP | 2044684 | 4/2009 |
| FR | 2290012 | 5/1976 |
| GB | 544312 | 4/1942 |
| JP | 2004-088929 | 3/2004 |
| RU | 1170567 | 7/1985 |
| RU | 1758821 | 8/1992 |
| WO | WO 2008/010213 | 1/2008 |
| WO | WO 2011/024167 | 3/2011 |

OTHER PUBLICATIONS

Translation of Office Action Dated Nov. 9, 2010 From the State Intellectual Property Office of the People's Republic of China Re. Application No. 200780029549.1.

Response Dated Mar. 16, 2011 to Office Action of Nov. 9, 2010 From the State Intellectual Property Office of the People's Republic of China Re. Application No. 200780029549.1.

Claims Filed in Response Dated May 5, 2011 to Office Action of Oct. 18, 2010 From the Instituto Mexicano de la Propriedad Industrial (IMPI) Re. Application No. MX/a/2009/000642.

International Search Report and the Written Opinion Dated Feb. 8, 2011 From the International Searching Authority Re. Application No. PCT/IL2010/000693.

Response Dated Apr. 27, 2011 to International Search Report and the Written Opinion of Feb. 8, 2011 From the International Searching Authority Re. Application No. PCT/IL2010/000693.

Examination Report Dated Feb. 21, 2011 From the Instituto Mexicano de la Propriedad Industrial (IMPI) Re. Application No. MX/a/2009/000642 and Its Summary in English.

Examiner's Report Dated Aug. 12, 2010 From the Australian Government, IP Australia Re. Application No. 2007274573.

International Search Report Dated Feb. 13, 2008 From the International Searching Authority Re.: Application No. PCT/IL2007/000892.

Singapore Written Opinion Dated Jun. 3, 2009 From the Intellectual Property Office of Singapore Issued by the Danish Patent and Trademark Office Re.: Application No. 200900293-2.

Written Opinion Dated Feb. 13, 2008 From the International Searching Authority Re.: Application No. PCT/IL2007/000892.

Examiner's Report Dated Aug. 12, 2010 From the Australian Government, IP Australia Re. Application No. 2007274573.

International Preliminary Report on Patentability Dated Jan. 29, 2009 From the International Bureau of WIPO Re.: Application No. PCT/IL2007/000892.

Official Action Dated Oct. 5, 2010 From the ROSPATENT, Federal Government Institution "Federal Institute of Industrial Property of the Federal Service for Intellectual Property, Patents and Trademarks" of the Russian Federation Re. Application No. 209105250 and Its Translation Into English.

International Preliminary Report on Patentability Dated Sep. 19, 2011 From the International Preliminary Examining Authority Re. Application No. PCT/IL2010/000693.

Response Dated Jul. 6, 2011 to the Examination Report of Feb. 21, 2011 From the Instituto Mexicano de la Propriedad Industrial (IMPI) Re. Application No. MX/a/2009/000642.

Translation of Office Action Dated Sep. 15, 2011 From the State Intellectual Property Office of the People's Republic of China Re. Application No. 200780029549.1.

* cited by examiner

VARIABLE VOLTAGE SUPPLY SYSTEM

RELATED APPLICATIONS

This Application is a National Phase of PCT Patent Application No. PCT/IL2007/000892 having International filing date of Jul. 16, 2007, which claims the benefit of priority of Israel Patent Application No. 179284 filed on Nov. 14, 2006 and U.S. Provisional Patent Application No. 60/831,238 filed on Jul. 17, 2006. The contents of the above Applications are all incorporated herein by reference.

FIELD OF THE INVENTION

The present invention is concerned with providing a variable voltage, for example a variable voltage system suitable for starting a motor and for running a motor under reduced load.

BACKGROUND OF THE INVENTION

Induction motors supply a back EMF voltage when they are running. During start-up, with no back EMF, the input impedance of the motors is relatively low and the surge voltage is high. This causes unnecessary currents to be drawn from the supply (line). Not only does this require that the motor be designed to withstand these lines, the line must have these large currents available.

A number of solutions have been proposed and are in use for providing a lower voltage during start-up and increasing the voltage as the speed of the motor increases.

One method is the "star-delta" configuration in which the motor is fed from a three phase transformer and the windings of the motor are switched from a star connection to the power line to a delta connection as the motor speeds up. This provides two levels of voltage for starting the motor. This method suffers from the following disadvantages:

1. There are only two voltage levels and there are commutation effects which cause spikes of voltage during changeover from one configuration to the other.
2. There is a need for 6 wires between the power controller and the motor.
3. The motor line current is identical to the current on the supply line, even during start-up.
4. The contactors switching between the 2 modes carry all the motor current.
5. The need for auxiliary large resistors to allow continuous current flow during the switch.

A second method utilizes a tapped autotransformer to vary the voltage. In this method, the voltage to the motor is supplied via a step-down autotransformer having multiple taps. The motor is first connected to the lowest tap and, as the motor speeds up, the input of the motor is transferred to successively higher voltages by changing the tap supplying the voltage. This method suffers from a number of different deficiencies. One is the requirement to switch the entire power being utilized, each time the voltage is changed. A second deficiency is that the coil and core of the transformer must be designed to carry the starting current of the motor. This makes the transformer very large and expensive, with sizes similar to those of the motor itself being common. A third deficiency is that there are serious commutation problems, since the output is disconnected each time the tap is changed. For this reason this methodology is not used extensively. Fourth, the contactors must carry the entire current when the voltages are switched.

A third method uses phase control to vary the voltage. In this method thyristors are used to control the voltage and the phase of firing of the thyristors is used to vary the voltage delivered to an output. This method does not deliver a sinusoidal voltage and its inefficiencies in starting motors are well known. In particular, there is an intrinsic phase delay, especially during start-up and power robbing transients when the thyristor fires. Furthermore, it is generally not possible to use capacitors for improvement of power factor with phase control.

Another issue that arises with control of induction motors is that they are most efficient at full load. When the load is reduced, the core losses remain high and the efficiency drops. It is known that reducing the voltage on induction motors when the load is less than the rated value results in more efficient operation. However, no practical way of implementing such change is known.

Israel patent 133307 filed Dec. 5, 1999, the disclosure of which is incorporated here by reference, describes a system for lighting control in which a transformer primary is placed across the input (between "line" and "return" connections) and the secondary is in series between the load and the line. The secondary is wound and attached to oppose (and thus reduce) the line voltage supplied to the load. This provides a reduced voltage at the load. When the full voltage is needed, the transformer input is disconnected from the return and short circuited, forcing the voltage on the secondary to zero. The secondary can then be short circuited. Multiple transformer stages can be supplied to provide a greater variation in load voltages. For three phase, this configuration is repeated three times.

SUMMARY OF THE INVENTION

An aspect of some embodiments of the present invention is concerned with supplying a varying voltage to a load, whereby more than two different voltages are provided to to the load, without the use of active elements and without substantial commutation problems.

As used herein, the term "without the use of active elements" or the like, means that active devices such as transistors and thyristors are not used in the power path between the input and the load.

In a broad aspect of the invention, the power input is a three phase power input and the power path includes a secondary of a three phase transformer whose primary is configurable such that the phase of the voltage of the secondary is different from the line to which it is connected by a phase different from 0 and 180 degrees.

In an embodiment of the invention the primaries are switchable between at least two positions at least one of which is (1) a position in which the primary is connected between two input phases; (2) a position in which the primary is connected between a first input phase and neutral; and (3) a position in which the primary is connected between a second input phase and neutral. Preferably, in a fourth configuration (4) the primary is disconnected and the secondary is optionally shorted. This configuration can provide at least 4 different output voltages. As used herein, the term "neutral" means either an actual or a virtual neutral, i.e., a point of near zero voltage formed when one end of the phases is connected together.

In an embodiment of the invention, when starting a motor, the primary is connected between the same phase as feeds the secondary and a second phase. The output voltage for the particular phase is the sum of the input voltage for that phase and the transformed phase to phase voltage. This voltage can be greater than the input voltage or less than the input voltage.

For motor starting the winding configuration which reduces the voltage is used. Assuming as an example, that the input voltage is 400 volts (line to line) and the transformation ratio is 400 to 110 volts, the resulting line to line output voltage is 253 V (no load). If the primary is switched from the second phase to neutral, the line to line output voltage is increased to 289 V (no load). It is noted that since the secondary remains connected between input and output, there are no commutation voltages generated by the change. Optionally, a snubber or other spike reducing circuitry is placed across the primaries.

Next, the primary is switched across a second phase and neutral. The resulting line to line output voltage is 356 V (no load). Then, the primary is disconnected from the input and the secondary is shorted. The output voltage is now the same as the input voltage, namely 400 V.

By choosing other transformation ratios, other voltages levels can be achieved. In addition, by changing the direction of connection of the primary, additional voltages, higher than the input voltage can be achieved. In the cases described, a voltage of 600, 515, and 460 V could be achieved, in addition to 400 V. Other voltages can also be achieved by other connections.

It is noted that the transformer transforms only a small percentage of the power utilized by the load. Thus the transformer can be smaller than the transformers used in prior art power varying methods such as the star-delta and tapped autotransformer methods.

In a second embodiment of the invention, fewer switching are performed and fewer levels of input voltage are achieved.

In some embodiments of the invention, as indicated above, the primaries are connected directly across the input lines and the secondary windings are series connected on the load side of the parallel connection of the primaries. In alternative embodiments of the invention, the secondary windings are series connected to the line side and the parallel connection of the primaries is on the load side, after the secondary windings. In yet another alternative embodiment of the invention, one side of each primary is connected at the line side of the secondary windings and the other of the primary winding is connected at the load side of the secondary windings.

An aspect of some embodiments of the invention is concerned with adjusting the voltage to a motor to provide more efficient operation as the load changes. It is known that an induction motor can operate at a lower voltage than its rated voltage when the mechanical power supplied by the motor is less than its rated power. When operated at this lower voltage, the power factor of the motor is increased resulting in lower losses in the motor and transformers and less disruption to the power system.

In an embodiment of the invention, the power supplied to the motor that is fed by the power supply is measured. The voltage is then reduced, optionally using the methodology described above, to a voltage which will give an improved power factor, while still supplying power at a current below the rated current of the motor and transformer.

While the invention has been described in the context of three phase systems, some elements of the invention are also applicable (with fewer voltage levels) to two phase systems and also to voltage change of power in one phase systems.

There is thus provided, in accordance with an embodiment of the invention, apparatus for controlling the voltage supplied to a load, comprising:

a multi-phase transformer having a primary and a secondary winding for each phase, each secondary being connected in series between an input line and an output connected to the load; and the primary is configurable by switches such that the phase of the voltage of the secondary is different from the line to which it is connected by a phase different from 0 and 180 degrees.

In an embodiment of the invention, the switches comprise:

a plurality of switches, switchable to switch the input of each of the primaries such that they are selectively connected in more than one of a plurality of configurations including at least one configuration in which the various primaries are connected between:

(a) the input phase to which its secondary is connected and another input phase;

(b) the input phase to which its secondary is connected and a neutral or virtual neutral;

(c) two phases different from the input phase to which its secondary is connected; and (d) a phase different from the input phase to which its secondary is connected and a neutral or virtual neutral.

In an embodiment of the invention, the plurality of switches is also capable of (e) shorting the primaries. Optionally, for (e), the respective secondary is also short circuited.

In an embodiment of the invention, the primaries and secondaries are configured such that voltage at the output is lower than the line voltage for each of (a) through (d).

In an embodiment of the invention, the plurality of switches is switchable to switch the input of each of the primaries such that they are selectively connectable between two, three or all of (a) to (d).

In an embodiment of the invention switching for (a) to (d) takes place only with respect to the primaries of the transformers.

In an embodiment of the invention, for switching between any of (a) to (d) no switching is necessary in the lines between the input and the load.

In an embodiment of the invention, the voltage at the output is higher than the line voltage for at least one configuration of the switches.

In an embodiment of the invention, the switches are capable of inverting the polarity of at least one of the connections.

In an embodiment of the invention, the multi-phase transformer is a three phase transformer and the input is a three phase voltage source.

In an embodiment of the invention, the primary windings are connected directly across the line inputs and the secondary windings axe series connected to the lines, on the load side of the parallel connection.

In an alternative embodiment of the invention, the secondary windings are connected in series with the line inputs and the primary windings are connected in parallel to the lines on the load side of the secondary windings.

In yet another alternative embodiment of the invention, one side of each primary is connected at the line side of the secondary windings and the other of the primary winding is connected at the load side of the secondary windings.

There is further provided, in accordance with an embodiment of the invention, a method of varying the voltage to a load comprising:

connecting apparatus according to the invention between a multi-phase input and a load;

varying the output voltage in at least one step by sequentially switching the primaries between different configurations corresponding to different voltages across the secondary.

Optionally, the output voltage is varied in steps from a lower voltage to a higher voltage.

Optionally, characteristics of the load are measured and wherein the voltage rise is stopped when the characteristics reach a given criteria.

Optionally, the load is an induction motor.

There is further provided, in accordance with an embodiment of the invention, a method of varying the voltage to an induction motor comprising:

connecting an apparatus for controlling power to a load between an input and an induction motor;

measuring the characteristics of the induction motor under a given voltage;

determining whether to raise or lower the voltage based on the characteristics; and varying the output voltage responsive to the determination.

Optionally, the apparatus is an apparatus according to the invention.

Optionally, the input line voltage is greater than 270 volts RMS.

Optionally, the load is a three phase motor.

BRIEF DESCRIPTION OF THE DRAWINGS

The following detailed description of certain non-limiting embodiments of the invention is provided to further elucidate the invention and to present the best mode known to the inventor for carrying out the invention.

The detailed description should be read in conjunction with the drawings listed below. Where applicable, the same reference numbers are used in the various figures to refer to the same or similar elements.

DETAILED DESCRIPTION

Figure 1:
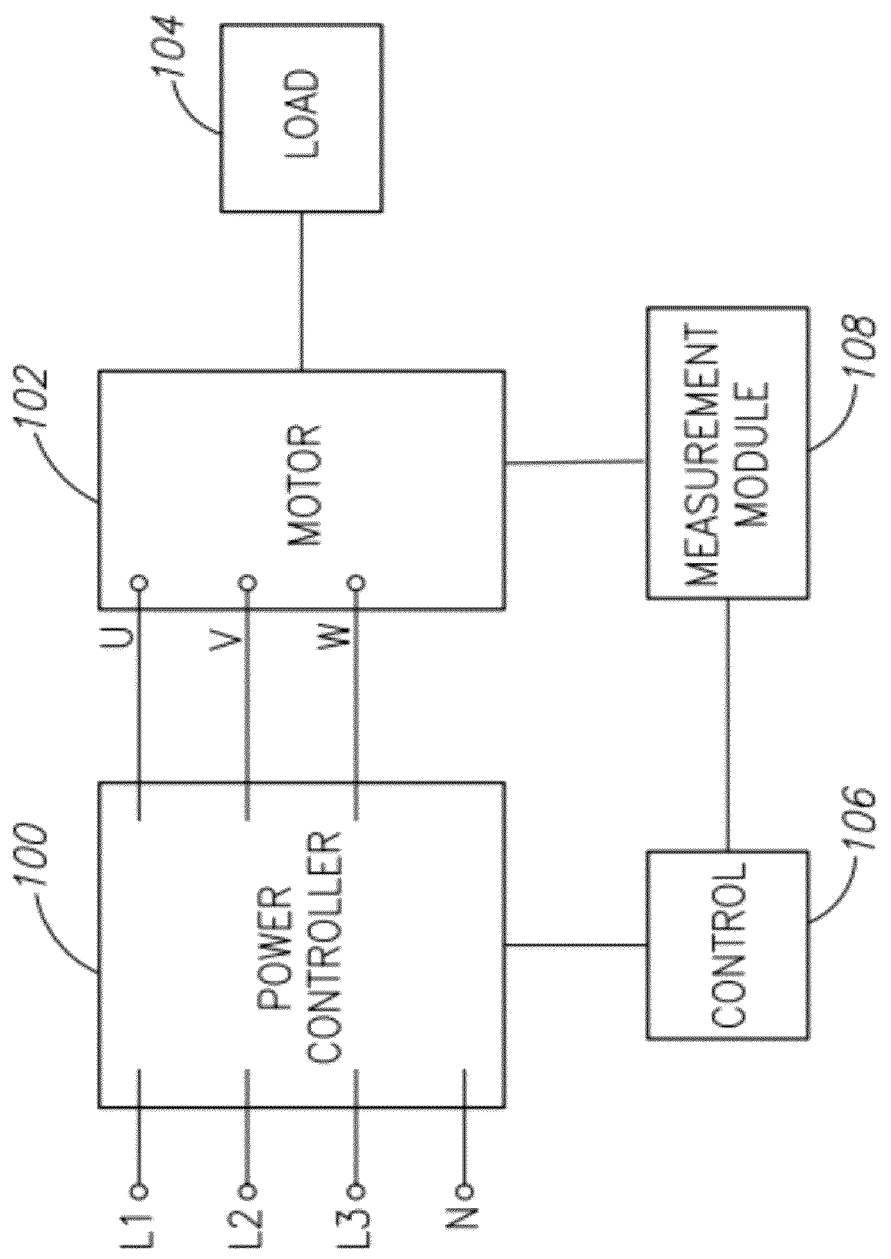
FIG. 1 is a schematic circuit drawing of a drive system powering a motor, in accordance with an exemplary embodiment of the invention.

FIG. 1 is a schematic circuit drawing of a power controller (drive system) 100 powering a motor 102, in accordance with an exemplary embodiment of the invention. As shown, power controller 100 receives three phase power at phases L1, L2 and L3 at a first voltage and delivers power to motor 100 at a variable output voltage at phases U, V and W. The motor drives a load 104. A neutral N may be supplied to the motor.

A controller 106 controls the operation of the power controllers and may be responsive to inputs from an optional measurement module 108, as explained below.

Figure 2:
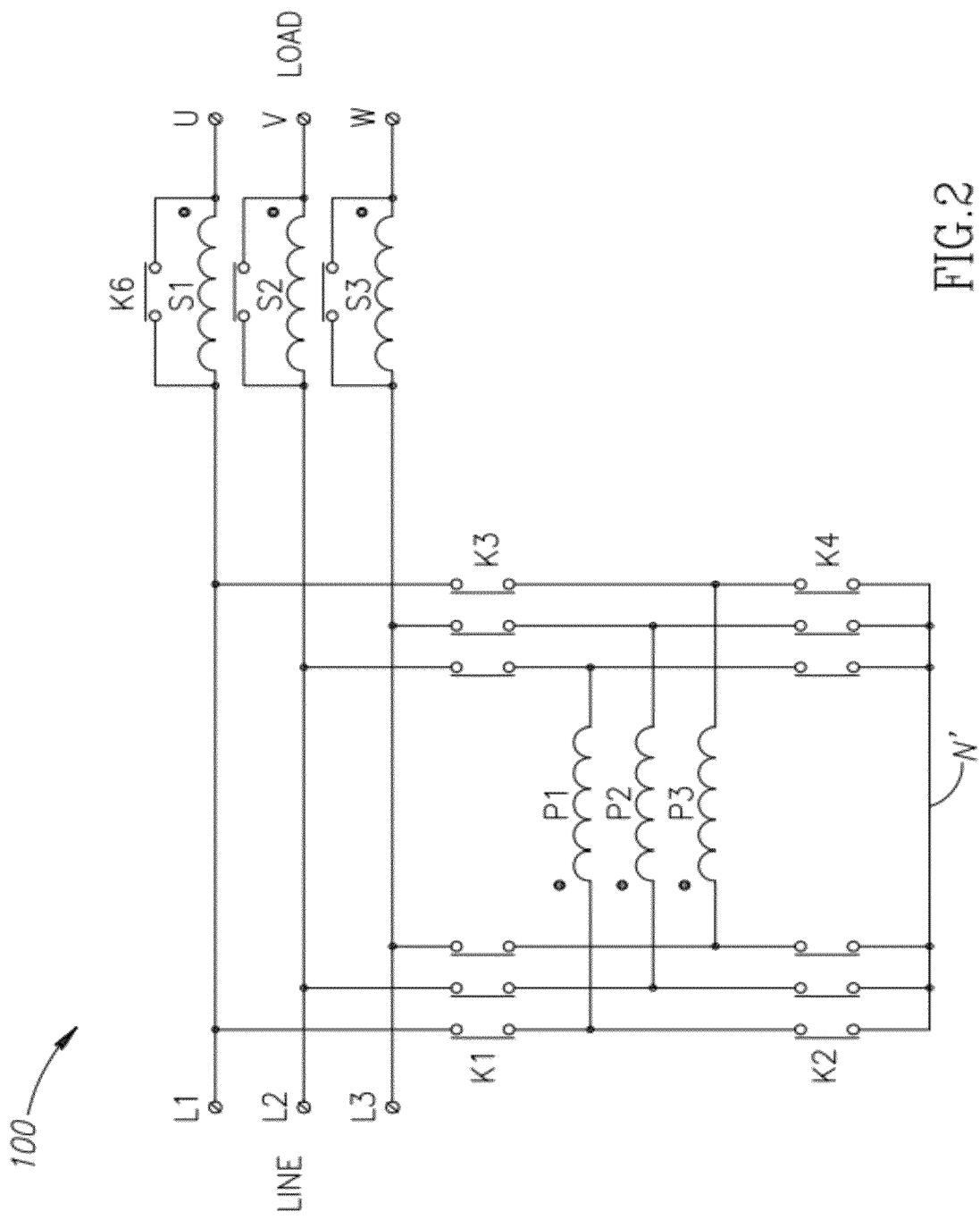
FIG. 2 is a circuit drawing of a transformer and associated switches in the drive system, in accordance with an embodiment of the invention.

FIG. 2 shows some details of circuitry of power controller 100, in an exemplary embodiment of the invention. In its simplest form the power controller comprises a three phase transformer having first windings designated as P1, P2 and P3 and secondary windings S1, S2 and S3. The secondary windings are connected in series between the line inputs and the load. In addition, the power controller includes a plurality of three phase switches K1, K2, K3 and K4, which are effective to connect the primary windings across the line inputs in different ways.

Additionally, an optional three phase switch K6 is used to short circuit the secondary windings under certain circumstances.

The main configurations of the switches are illustrated in the following figures.

Figure 3A:
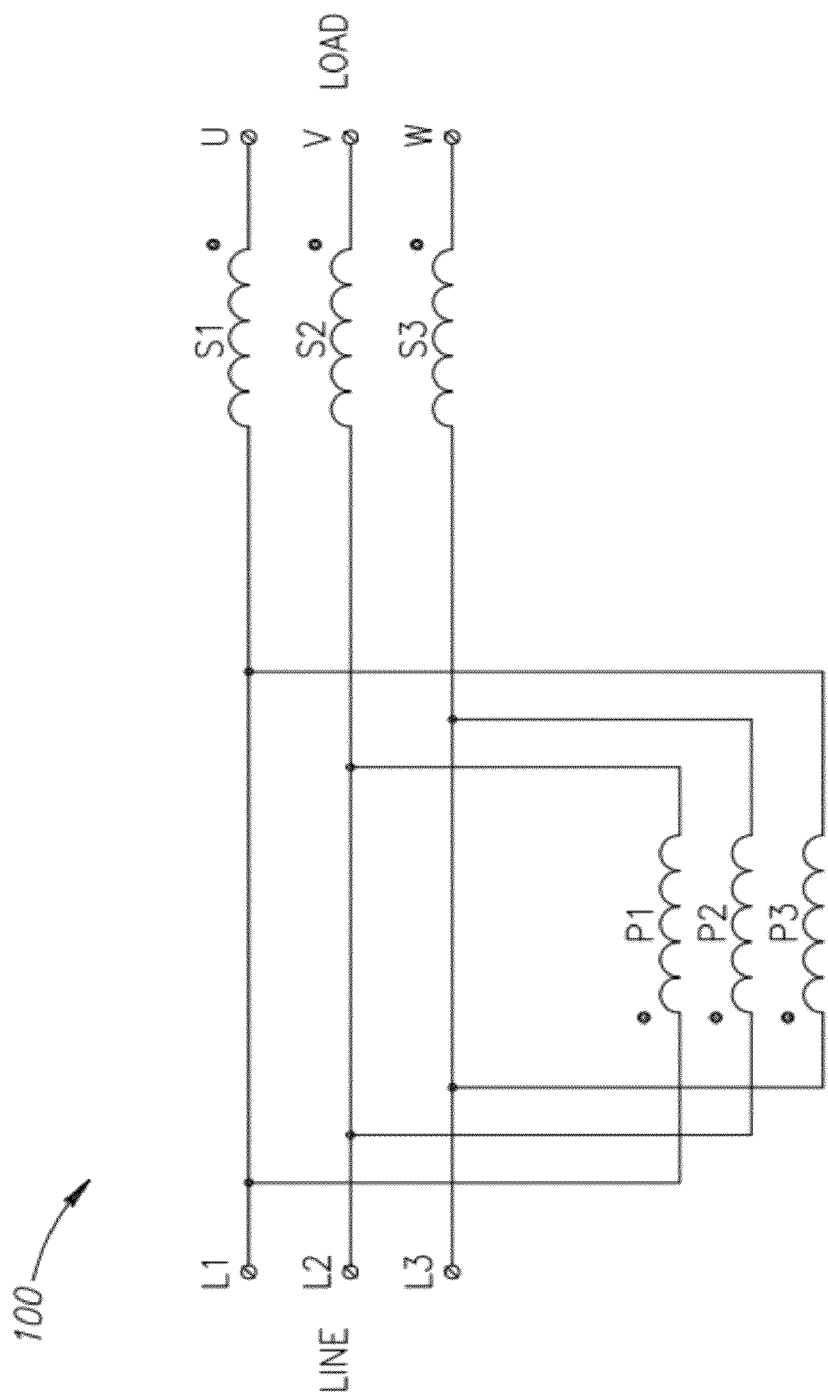
FIGS. 3A and 3B are respectively the connections of the circuit of FIG. 2 and a phasor diagram for a first configuration in which a lowest voltage is achieved.
Figure 3B:
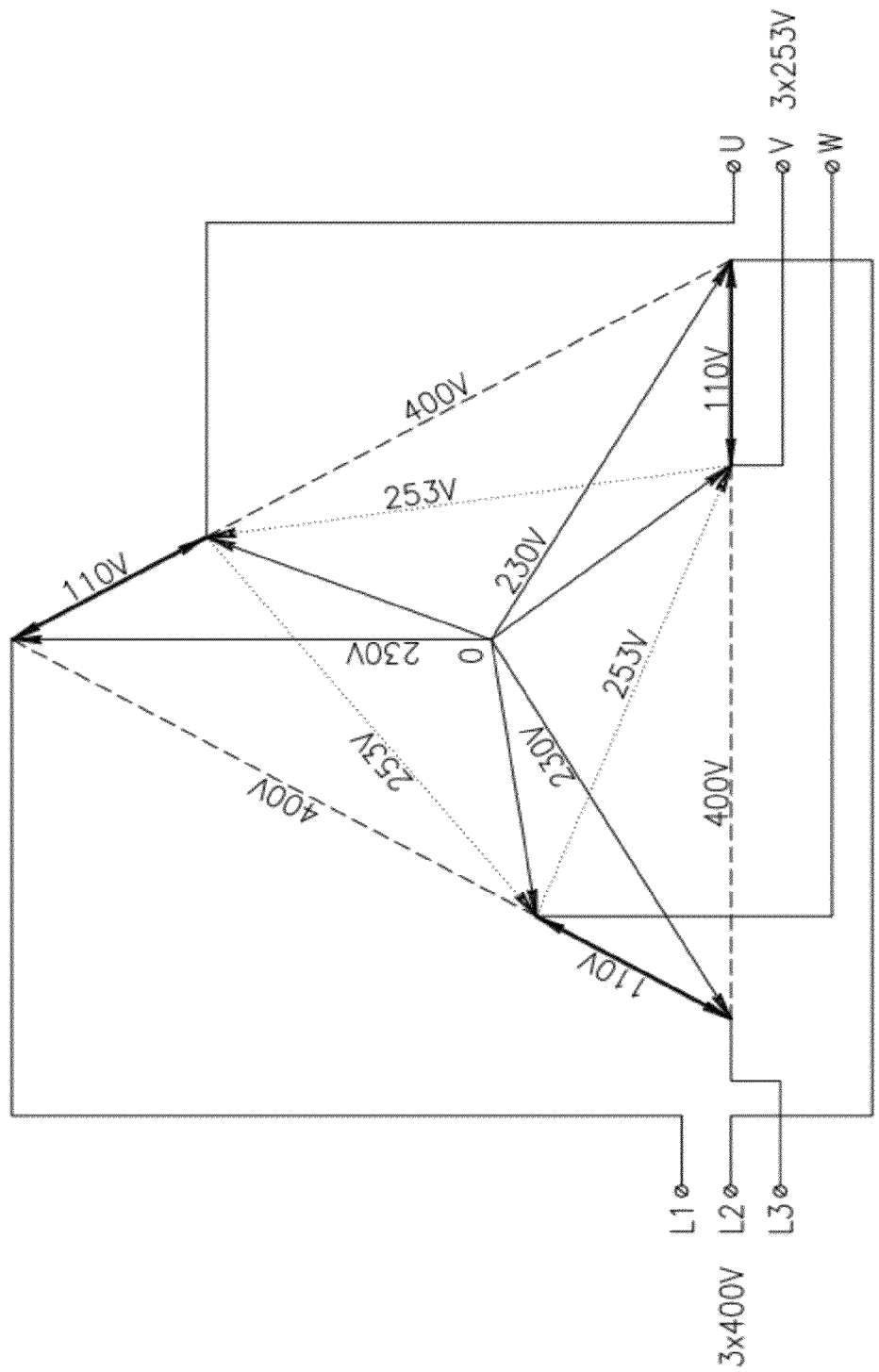

FIGS. 3A and 3B are respectively the connections of the circuit of FIG. 2 and a vector diagram for a first configuration in which a lowest voltage is delivered to the load.

FIG. 3A shows the circuit of FIG. 2 when switches K1 and K3 are closed and the other switches are open. In this configuration, P1 is connected between line phases 1 and 2, P2 is connected between line phases 2 and 3 and P3 is connected between line phases 3 and 1.

Since the phase of the voltage applied to the primaries is 30° out of phase with the line to which the secondary is connected, the phase diagram shown in FIG. 3B results. By way of illustration, and without limiting the invention, a primary secondary ratio of 400/100 is assumed and the input voltage is assumed to be 400 volts.

For the winding directions shown the resulting phase to phase output voltages U, V, W are 253 volts.

Figure 4A:
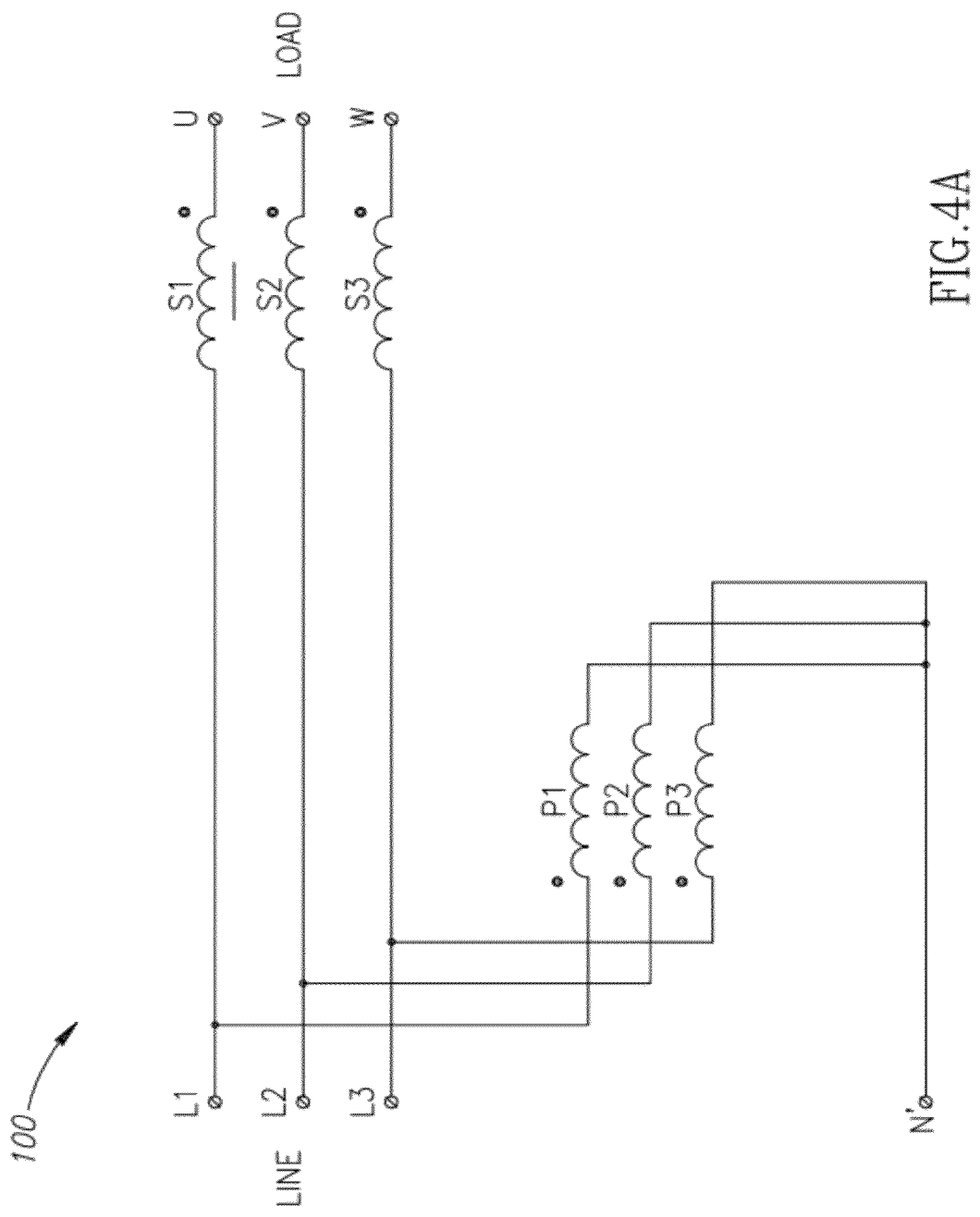
FIGS. 4A and 4B are respectively the connections of the circuit of FIG. 2 and a phasor diagram for a second configuration in which a first higher voltage is achieved.
Figure 4B:
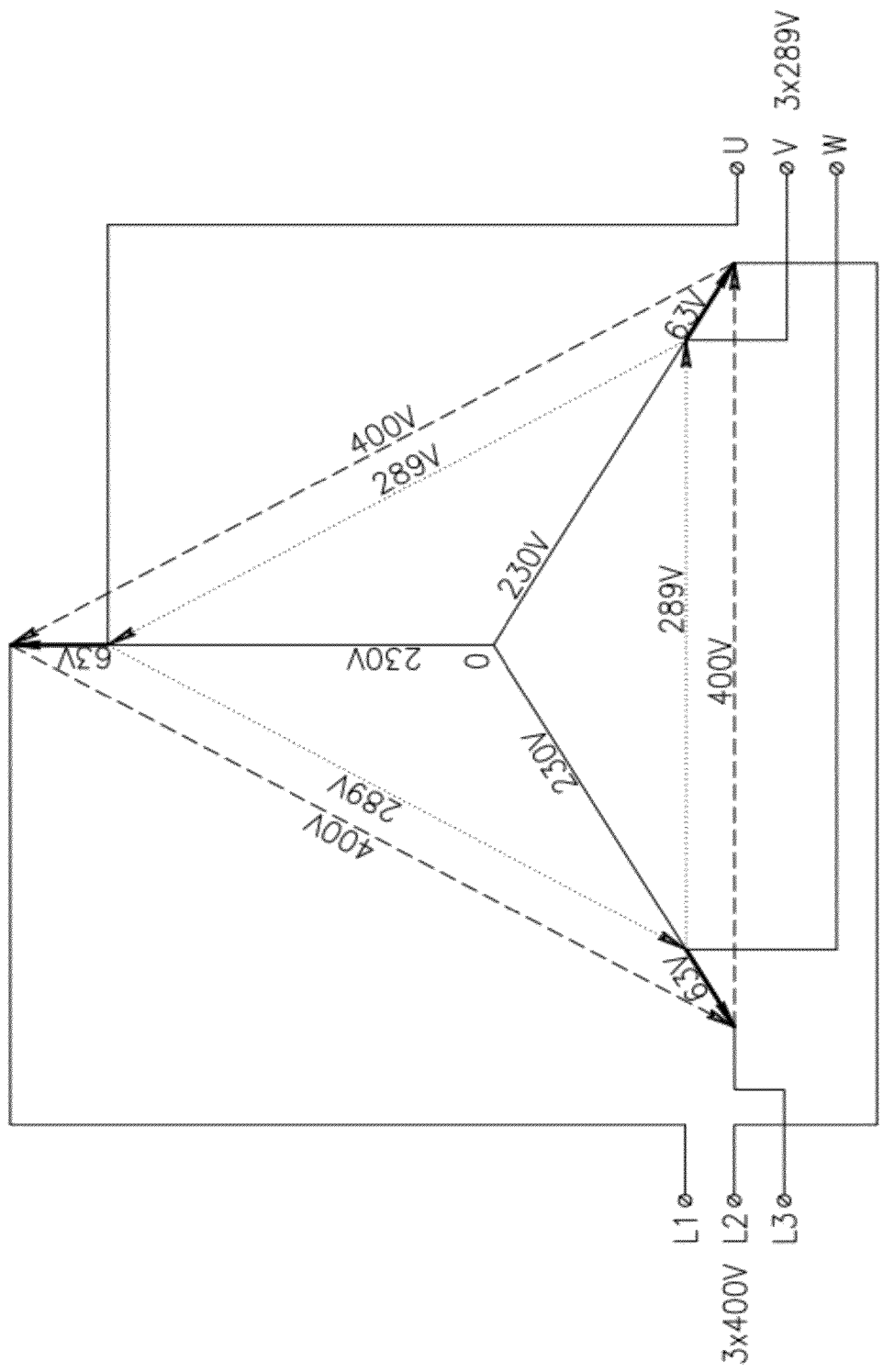

FIGS. 4A and 4B are respectively the connections of the circuit of FIG. 2 and a phasor diagram for a second configuration in which a next higher voltage is delivered to the load.

FIG. 4A shows the circuit of FIG. 2 when switches K1 and K4 are closed and the other switches are open. In this configuration, each of P1, P2 and P3 is connected between its own phase and neutral. Optionally, the connection can be to an actual neutral or to a virtual neutral N' formed by the connection of one end of the transformers to a same point.

Since the phase of the voltage applied to the primaries is in phase with the line to which the secondary is connected, the phase diagram shown in FIG. 4B results. By way of illustration, and without limiting the invention, a primary secondary ratio of 400/100 is assumed and the input voltage is assumed to be 400 volts. Since the voltage on each of the P windings is 253 volts, the secondary voltages are 63 volts, out of phase with the input line voltages. The phase to phase voltages U, V, W are then 289V.

It is noted that when switching (break before make, is desirable) between the configurations of FIG. 3A and FIG. 4A the current to the motor is not interrupted, although the secondary windings momentarily provide a high impedance, since the primary is open circuited. Optionally, a snubber or other spike reducing circuitry is placed across the primaries.

Figure 5A:
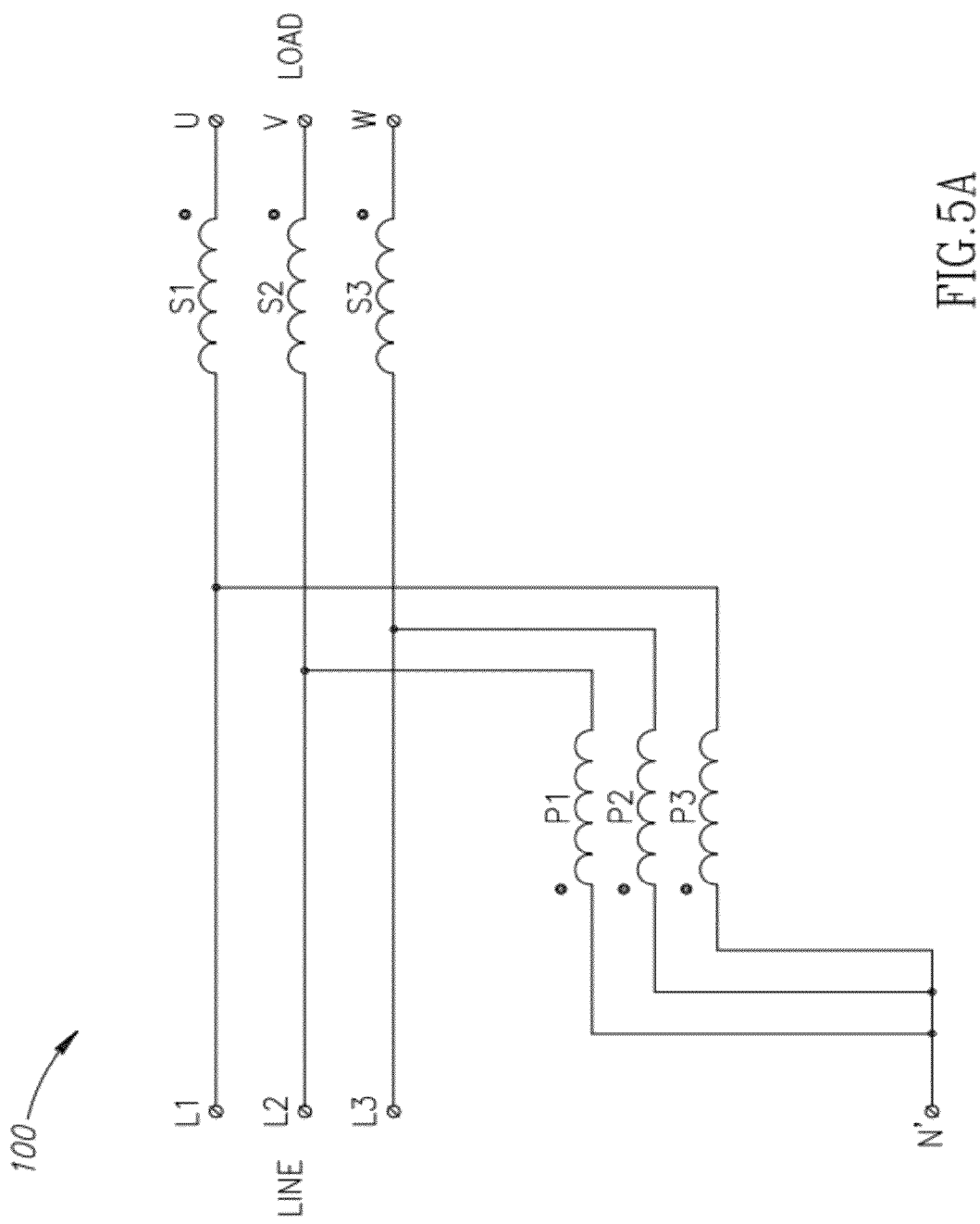
FIGS. 5A and 5B are respectively the connections of the circuit of FIG. 2 and a phasor diagram for a third configuration in which a second higher voltage is achieved.
Figure 5B:
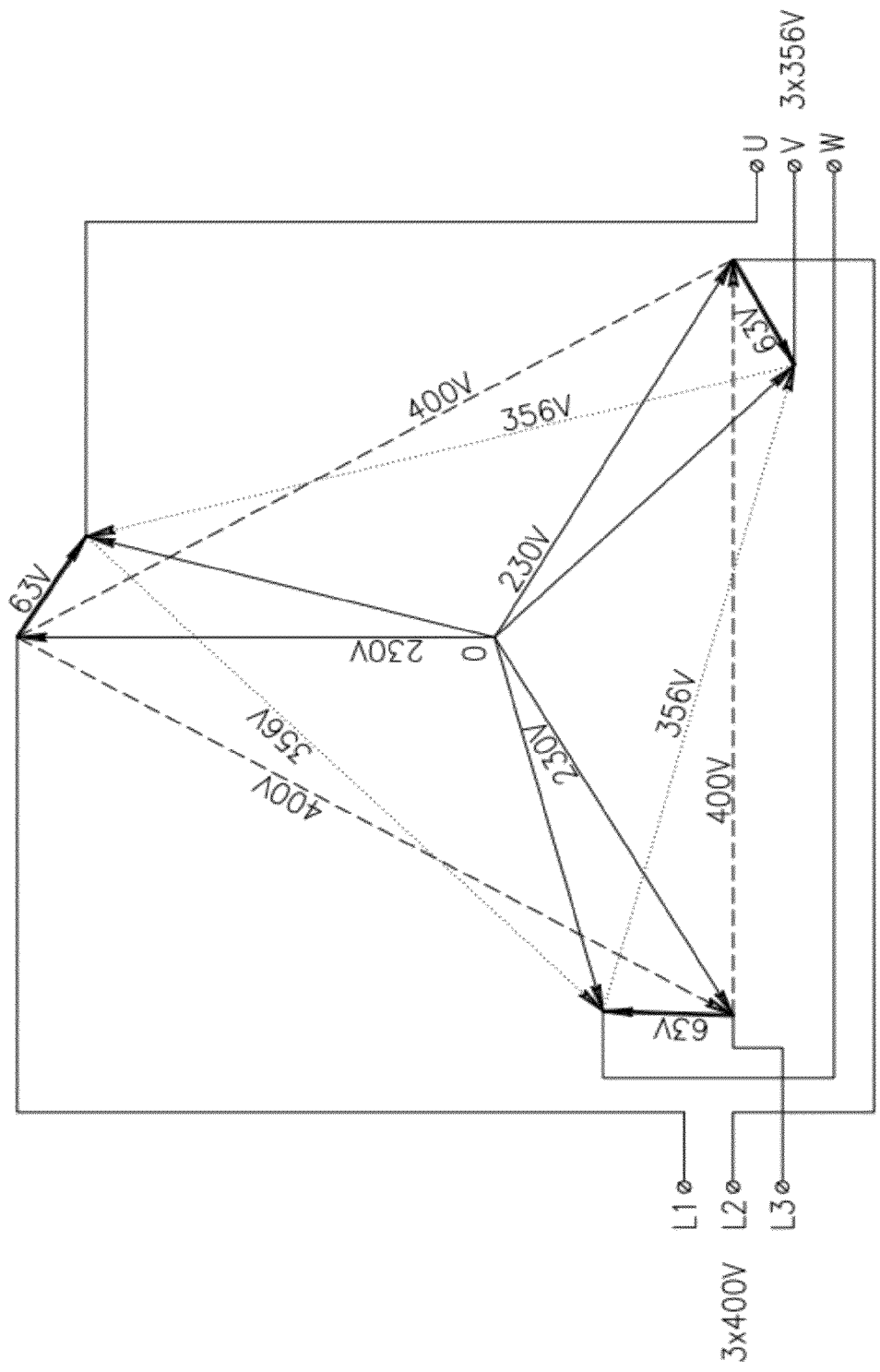

FIGS. 5A and 5B are respectively the connections of the circuit of FIG. 2 and a phasor diagram for a third configuration in which a next higher voltage is delivered to the load.

FIG. 5A shows the circuit of FIG. 2 when switches K2 and K3 are closed and the other switches are open. In this configuration, each of P1, P2 and P3 is connected between another phase and neutral.

Since the phase of the voltage applied to the respective primaries is 60° out of phase with the line to which the secondary is connected, the phase diagram shown in FIG. 5B results. By way of illustration, and without limiting the invention, a primary secondary ratio of 400/100 is assumed and the input voltage is assumed to be 400 volts. Since the voltage on each of the P windings is 253 volts, the secondary voltages are 63 volts. The phase to phase voltages U, V, W are then 356V.

Figure 6A:
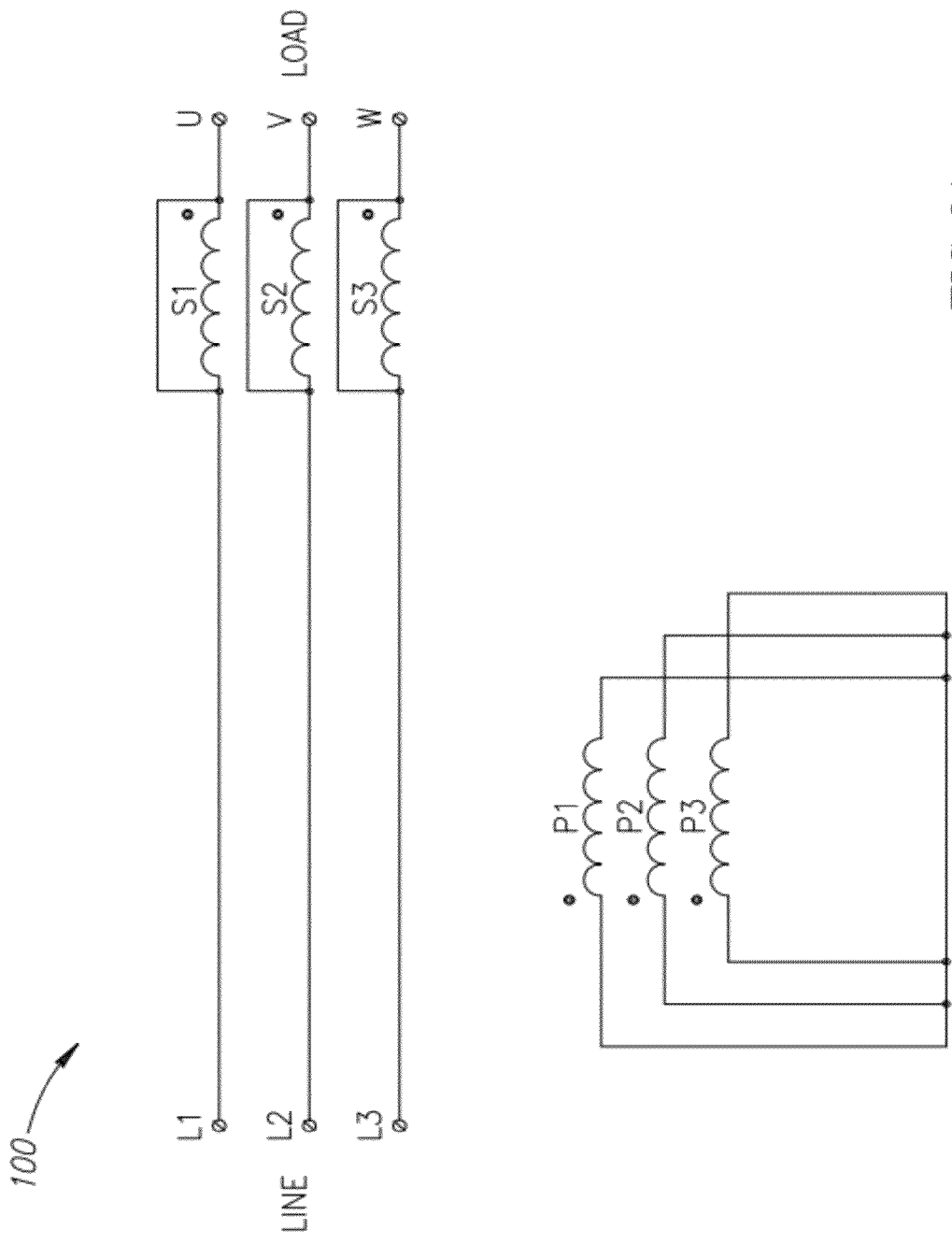
FIGS. 6A and 6B are respectively the connections of the circuit of FIG. 2 and a phasor diagram for a fourth configuration in which the line voltage is delivered to the motor.
Figure 6B:
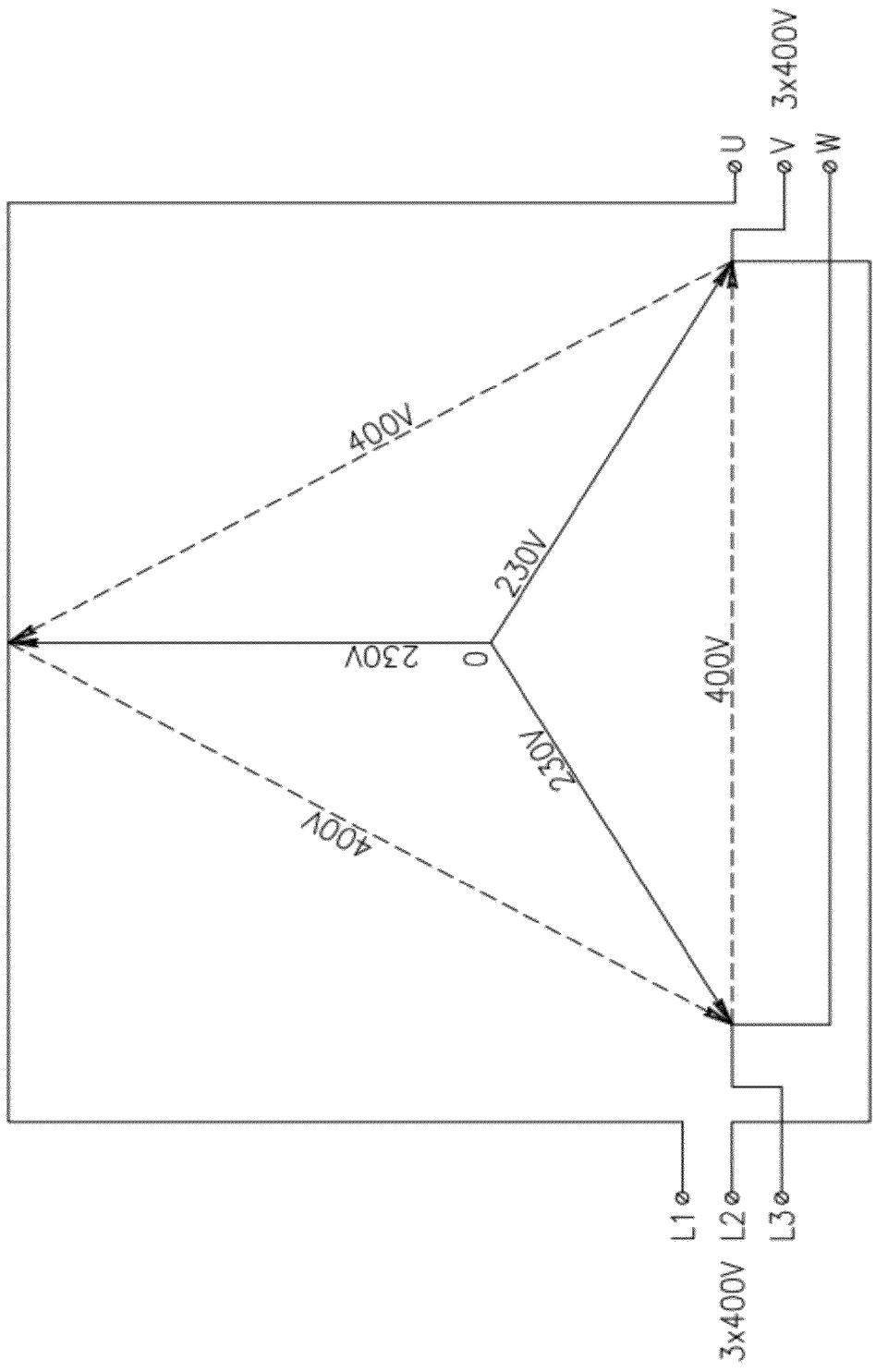

FIGS. 6A and 6B are respectively the connections of the circuit of FIG. 2 and a phasor diagram for a fourth configuration in which the input line voltage is delivered to the load.

FIG. 6A shows the circuit of FIG. 2 when switches K2 and K4 are closed and the other switches are open, except that K6 is optionally closed. In this configuration, each of P1, P2 and Ps are disconnected from the line and shorted and the secondaries are optionally shorted as well. Thus, no substantial voltage opposes the input line voltage and that voltage, namely 400 volts is applied directly to the motor.

It is to be understood that shorting the secondaries is not absolutely necessary. However, they are preferably shorted to avoid core and/or conduction losses in the transformer.

If fewer voltage steps are required, then the number of switches on the primary side can be reduced. For example, if K3 and K4 are replaced by short circuits, closing K1, while keeping K2 and K6 open will result in the configuration of FIG. 3A and will supply a voltage of 253 volts to the load. Opening K1 and shorting K2 and optionally K6 will result the configuration of FIG. 6A and will deliver the input line voltage to the load.

The present invention has thus far been described in the context of providing voltages below or equal to that of the line voltage to the load, as for example, for starting an induction motor. However, a similar configuration can be used to provide one or more higher than line voltages to the load, if the windings on the transformer (or the primary or secondary connections) are reversed, for example by inverting the connections of the primary. Such configurations might be useful where a higher than running voltage is required for starting or where more voltage steps are considered desirable. Providing intermediate steps may require more switches.

Similarly, further intermediate voltages can be achieved by switching the primaries in different ways, for example, by connecting the primaries between a different phase from the secondary. It is noted however, that in the preferred embodiments shown, all switching is in the low current side and there are no switches in the main current path.

In the embodiment (100) described above and shown in FIGS. 2-6, the primaries are connected directly across the input lines and the secondary windings are series connected on the load side of the parallel connection of the primaries. In alternative embodiments of the invention, the secondary windings are series connected to the line side and the parallel connection of the primaries is on the load side, after the secondary windings.

Figure 7:
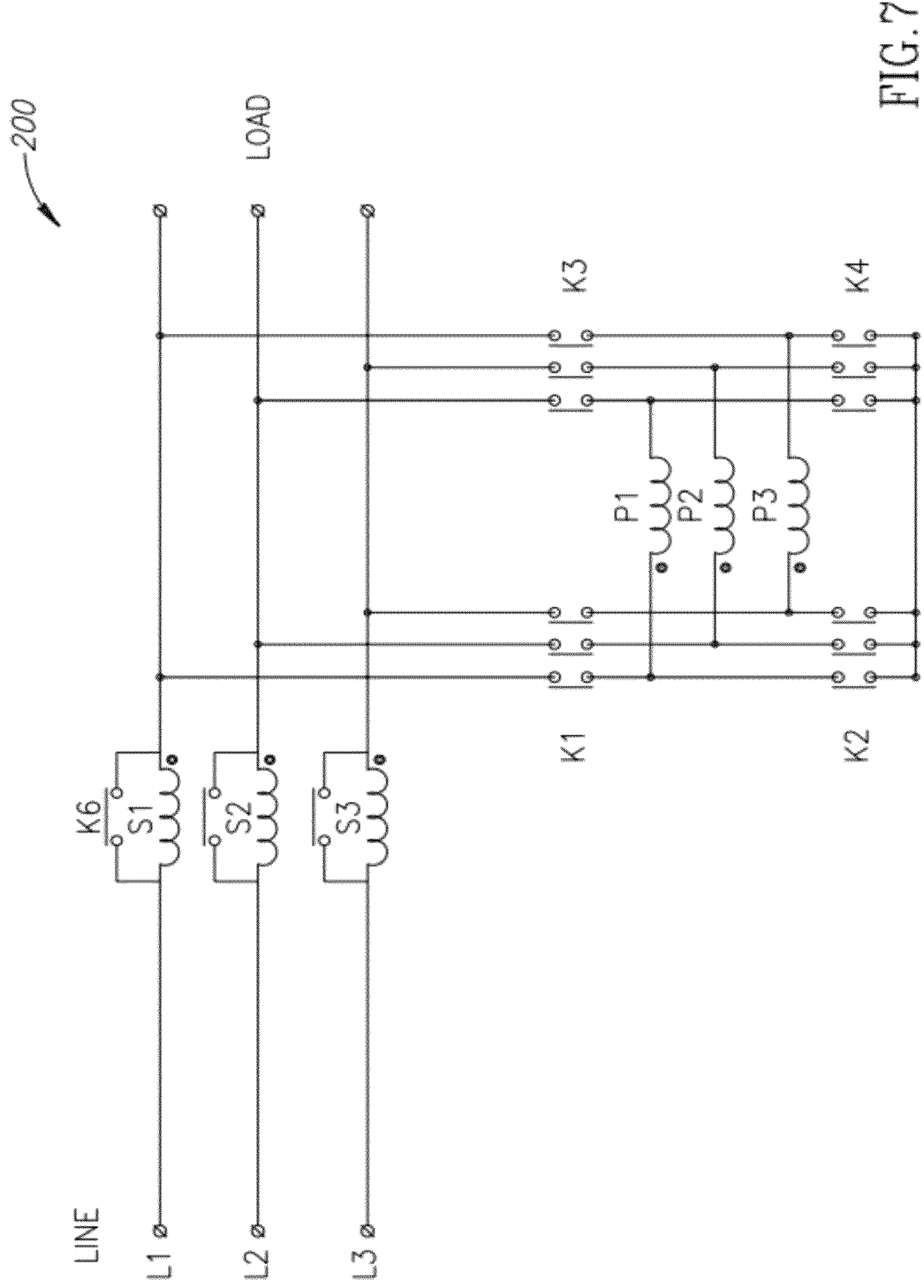
FIG. 7 is a circuit drawing of a transformer and associated switches in the drive system, in accordance with an embodiment of the invention.

FIG. 7 shows such a connection, for a power controller 200, in which each of the references for the windings and the switches is the same as in FIG. 2. The operation of power controller 200 is analogous to that of power controller 100 and the same switching results in the same voltages as described above. In some embodiments of the invention, controller 200 {replaces controller 100 in FIG. 1.

In some embodiments of the invention, the objective is to match the voltage on an induction motor or other load when the load is reduced. For an induction motor, for any given mechanical load, the speed of rotation and the current drawn adjust themselves automatically to conform to the mechanical load. As the load is reduced, the speed rises so that it is closer to synchronous speed and the current falls, with the power factor and efficiency falling as well. In an embodiment of the invention, the voltage applied is adjusted so that the motor operates near full rated current and power for that input voltage.

In yet another alternative embodiment of the invention, one side of each primary is connected at the line side of the secondary windings and the other of the primary winding is connected at the load side of the secondary windings.

Figure 8:
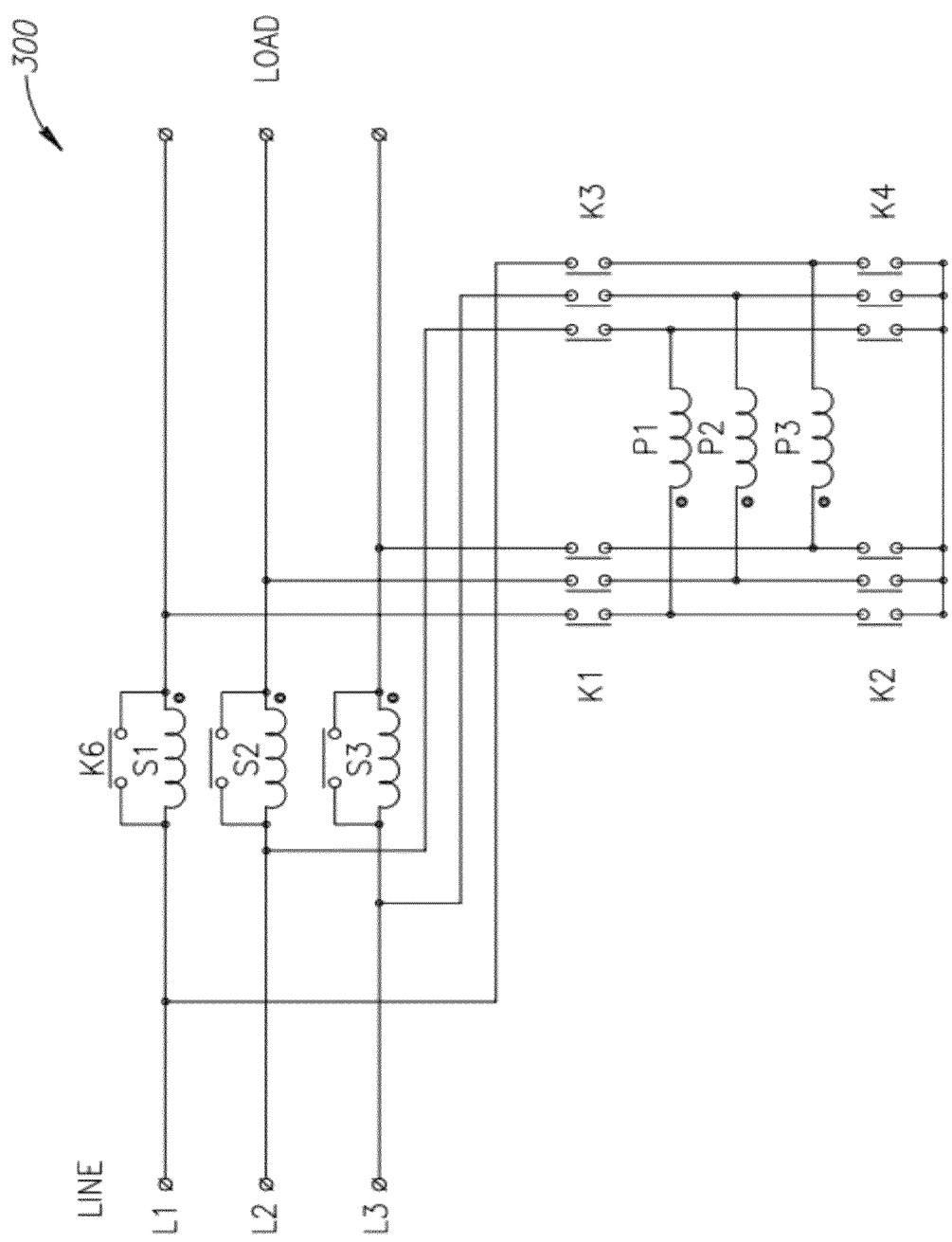
FIG. 8 is a circuit drawing of a transformer and associated switches in the drive system, in accordance with yet another embodiment of the invention

FIG. 8 shows such a connection, for a power controller 300, in which each of the references for the windings and the switches is the same as in FIG. 2. The operation of power controller 300 is analogous to that of power controller 100 and the same switching results in the same voltages as described above. In some embodiments of the invention, controller 300 replaces controller 100 in FIG. 1.

While the operation of the embodiments of FIGS. 7 and 8 is generally similar to that of FIG. 2, the voltages (and preferred transformer ratio) may be somewhat different, depending on the utilization of the invention. For example, for the embodiment of FIG. 7, with a primary rated at 230 V and a secondary at 110V, the output voltages are 220V, 250V, 300V and 400V for shorting of K1, K3; K1, K4; K2, K3; and K2, K4 and K6, respectively. For example, for the embodiment of FIG. 8, with a primary rated at 280 V and a secondary at 120V, the output voltages are 230V, 260V, 320V and 400V for shorting of K1, K3; K1, K4; K2, K3; and K2, K4 and K6, respectively. It is emphasize that for all three embodiments, a wide choice of primary/secondary ratios are available and can be adjusted to give a variety of values of voltage at the various steps.

The adjustment of the voltage can be made automatically in response to a measurement of RPM of the motor, or current drawn or phase of the current.

Returning to FIG. 1, measurement module 108 is used to measure one or more indicators of the loading of motor 102. Such indicators include the power into the motor, the phase of the current (with respect to the voltage) of the power input to the motor, the rotation rate of the motor and current. Alternatively, the electrical characteristics of the motor can be measured upstream of the power controller.

Each of these indicators can be used to access whether the motor is operating at a proper voltage for the mechanical load or whether the voltage delivered to the motor is too high for most efficient operation.

In particular, when the power input to the motor is below a given threshold for any given input voltage, then the assumption is that the voltage can be safely reduced (with concomitant increase in current) to supply the same mechanical load. If the phase of the current lags phase of the voltage by more than a given value, then the same assumption can be reached. Similarly, a rotation speed that is closer than some value to the synchronous speed of the motor indicates that the motor is under loaded for the input voltage to the motor.

In each of these cases, controller 106 determines whether the motor can deliver the required power at the next available voltage and still be within a current limit that is characteristic of the motor. If it can, then the voltage supplied by power controller 100 is adjusted to the next lower voltage available. Similarly, controller 106 can determine, based on operational characteristics supplied by measurement module 108, that the motor is near the highest power that it can achieve at the voltage being supplied. In this case, controller 106 can change the switch patterns in power controller 100, 200 or 300 to supply a higher voltage to the motor.

Figure 9:
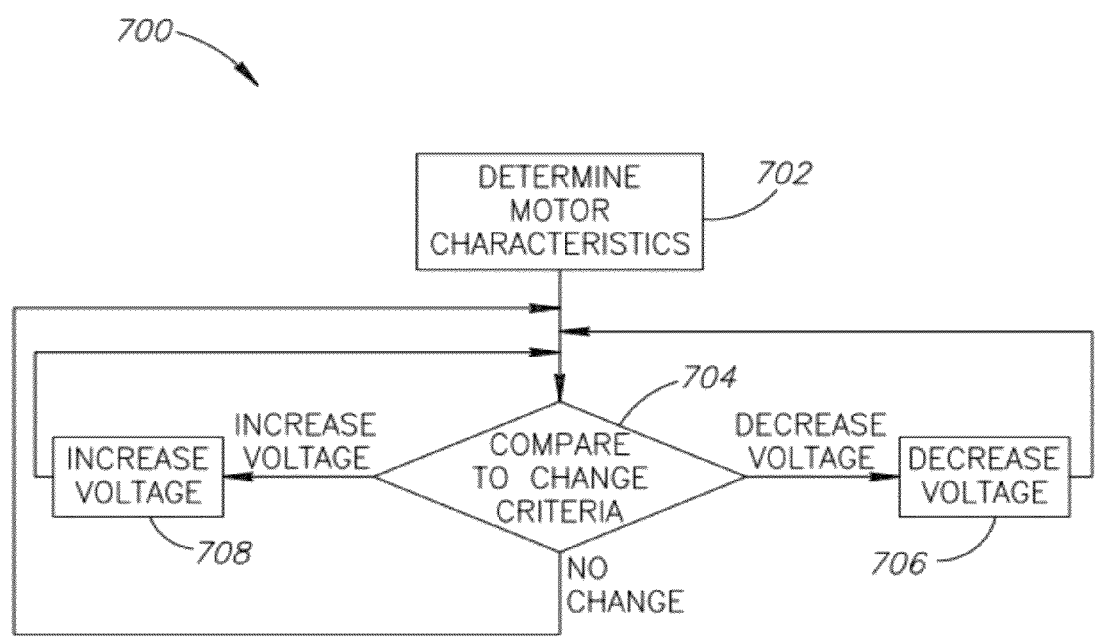
FIG. 9 is a flow chart of a methodology of control of the voltage of an induction motor to match the voltage to the load on the motor.

FIG. 9 is a flow chart of a methodology 700 of control of the voltage of an induction motor to match the voltage to the load on the motor. At 702 the motor characteristics are determined. At 704, the motor characteristics are compared to criteria for determining whether the voltage can be increased or decreased, as described above. If the voltage is the "correct" voltage for the load, module 108 and controller 106 continue to monitor whether a change in voltage is desirable. If the voltage is determined to be reducible, then, it is reduced 706. If it is determined that it should be increase, then it is increased 708. In each case, the characteristics are monitored to determine if the voltage is proper.

Optionally, controller 106 incorporates information regarding the operating characteristics of the motor and uses these characteristics to determine whether to switch the motor to the next higher or lower voltage.

It should be understood that when starting the motor, measurements of motor operating characteristics may indicate that the motor does not need the highest available voltage to supply the power needed by the motor. Under these circumstances, one or more of the switching operations to the higher voltages are optionally not performed.

While the use of a power controller to reduce or control the voltage supplied to the motor based on motor operation characteristics has been explained utilizing power controller 100, 200 or 300 described above, other power controllers known in the art can be used for this purpose.

It should also be understood that while it is desirable to monitor the motor characteristics to determine when to switch the voltages, in some embodiments of the invention, the switching is performed automatically during start-up of the motor, with the switching taking place a given time after the previous switching or after the input current drops below some value or below a percentage of its initial value. In this case, the controller can be considered to consist of a timer or simple current measurement apparatus.

It will be appreciated that the above described methods may be varied in many ways, including, changing the order of steps, and/or performing a plurality of steps concurrently. It should also be appreciated that the above described description of methods and apparatus are to be interpreted as including apparatus for carrying out the methods, and methods of using the apparatus. The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art. Furthermore, the terms "comprise," "include," "have" and their conjugates, shall mean, when used in the claims, "including but not necessarily limited to."

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims.

The invention claimed is:

1. Apparatus for controlling the voltage supplied to a load, comprising:
   a multi-phase transformer having a primary and a secondary winding for each phase, each secondary being connected in series between an input line and an output connected to the load; and
   the primary is configurable by switches to selectively connect the primary to different ones of the phases,
   wherein said switching between configurations is break before make.

2. Apparatus according to claim 1 wherein the switches comprises:
   a plurality of switches, switchable to switch the input of each of the primaries such that they are selectively connected in more than one of a plurality of configurations including at least one configuration in which the various primaries are connected between:
   (a) the input phase to which its secondary is connected and another input phase;
   (b) the input phase to which its secondary is connected and a neutral or virtual neutral;
   (c) two phases different from the input phase to which its secondary is connected; and
   (d) a phase different from the input phase to which its secondary is connected and a neutral or virtual neutral.

3. Apparatus according to claim 2 wherein the plurality of switches is also configured for (e) shorting the primaries.

4. Apparatus according to claim 3 wherein for (e) the respective secondary is also short circuited.

5. Apparatus according to claim 2 wherein the primaries and secondaries are configured such that voltage at the output is lower than the line voltage for each of (a) through (d).

6. Apparatus according to claim 2 wherein the plurality of switches is switchable to switch the input of each of the primaries such that they are selectively connectable between two or more of (a) to (d).

7. Apparatus according to claim 2 wherein the plurality of switches is switchable to switch the input of each of the primaries such that that they are selectively connectable between three or more of (a) to (d).

8. Apparatus according to claim 2 wherein switching for (a) to (d) takes place only with respect to the primaries of the transformers.

9. Apparatus according to claim 1 wherein the voltage at the output is higher than the line voltage for at least one configuration of the switches.

10. Apparatus according to claim 1 wherein the switches are configured for inverting the polarity of at least one of the connections.

11. Apparatus according to claim 1 wherein the multi-phase transformer is a three phase transformer and wherein the input is a three phase voltage source.

12. Apparatus according to claim 1 wherein the primary windings are connected directly across the line inputs and the secondary windings are series connected to the lines, on the load side of the parallel connection.

13. Apparatus according to claim 1, wherein the secondary windings are connected in series with the line inputs and the primary windings are connected in parallel to the lines on the load side of the secondary windings.

14. Apparatus according to claim 1, wherein the secondary windings are connected in series with the line inputs and one side of each primary is connected at the line side of the secondary windings and the other of the primary winding is connected at the load side of the secondary windings.

15. A method of varying the voltage to a load comprising:
controlling a multi-phase transformer having a primary and a secondary winding for each phase, each secondary being connected in series between an input line and an output connected to the load;
selectively connecting the primary to different ones of the phases, wherein the connecting is break before make;
varying the output voltage in at least one step by sequentially switching the primaries between different configurations corresponding to different voltages across the secondary.

16. A method according to claim 15 wherein the output voltage is varied in steps from a lower voltage to a higher voltage.

17. A method according to claim 16 wherein characteristics of the load are measured and wherein the voltage rise is stopped when the characteristics reach a given criteria.

18. A method according to claim 15, wherein the load is an induction motor.

19. A method of varying the voltage to an induction motor comprising:
connecting a multi-phase transformer having a primary and a secondary winding for each phase for controlling power to a load between an input and an induction motor, wherein each secondary is connected in series between an input line and an output connected to the load;
selectively connecting the primary to different ones of the phases, wherein the connecting is break before make;
measuring indicators of loading of the induction motor under a given voltage;
determining whether to raise or lower the voltage based on the indicators; and
varying the output voltage responsive to the determination.

20. A method according to claim 15, wherein the input line voltage is greater than 270 volts RMS.

21. A method according to claim 15 wherein the load is a three phase motor.

22. A three phase voltage supply apparatus for supplying voltage to a load from a three phase source, comprising:
a multi-phase transformer having an input terminal for each input phase line having a primary and a secondary winding for each phase;
a switching arrangement for switching between at least two configurations including a first configuration in which each secondary is connected in series between an input line and an output connected to the load and each primary is connected between different ones of the phases; and a second configuration in which each primary is connected between each input line associated with secondary and ground or neutral, said switching being made on a break before make basis.

23. Apparatus according to claim 22 wherein switching arrangement is further configured for connecting the primary between the input phase to which its secondary is connected and another input phase.

24. Apparatus according to claim 23 and including:
a plurality of switches, switchable to switch the input of each of the primaries such that they are selectively connected in more than one of a plurality of configurations including at least one configuration in which the various primaries are connected between:
(a) the input phase to which its secondary is connected and another input phase;
(b) the input phase to which its secondary is connected and a neutral or virtual neutral;
(c) a phase different from the input phase to which its secondary is connected and a neutral or virtual neutral; and
(d) two phases different from the input phase to which its secondary is connected.

25. Apparatus according to claim 24 wherein the plurality of switches is also configured for (e) shorting the primaries.

26. Apparatus according to claim 25 wherein for (e) the respective secondary is also short circuited.

27. Apparatus according to 25 claims wherein the primaries and secondaries are configured such that voltage at the output is lower than the line voltage for each of (a) through (d).

28. Apparatus according to claim 25 wherein the plurality of switches is switchable to switch the input of each of the primaries such that they are selectively connectable between two or more of (a) to (d).

29. Apparatus according to claim 25 wherein the plurality of switches is switchable to switch the input of each of the primaries such that that they are selectively connectable between three or more of (a) to (d).

30. Apparatus according to claim 25 wherein switching for (a) to (d) takes place only with respect to the primaries of the transformers.

31. Apparatus according to claim 25 wherein the voltage at the output is higher than the line voltage for at least one configuration of the switches.

32. Apparatus according to claim 25 wherein the switches are capable of inverting the polarity of at least one of the connections.

* * * * *